US010922232B1

(12) United States Patent
Feero et al.

(10) Patent No.: US 10,922,232 B1
(45) Date of Patent: Feb. 16, 2021

(54) USING CACHE MEMORY AS RAM WITH EXTERNAL ACCESS SUPPORT

(71) Applicant: Apple Inc., Cupertino, CA (US)

(72) Inventors: Brett S. Feero, Austin, TX (US); David E. Kroesche, Austin, TX (US); David J. Williamson, Austin, TX (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/400,847

(22) Filed: May 1, 2019

(51) Int. Cl.
  *G06F 12/08* (2016.01)
  *G06F 12/0873* (2016.01)
  *G06F 12/084* (2016.01)
  *G06F 12/0888* (2016.01)
  *G06F 12/0837* (2016.01)

(52) U.S. Cl.
  CPC ........ *G06F 12/0873* (2013.01); *G06F 12/084* (2013.01); *G06F 12/0837* (2013.01); *G06F 12/0888* (2013.01)

(58) Field of Classification Search
  CPC ............... G06F 12/0837; G06F 12/084; G06F 12/0844; G06F 12/0857; G06F 12/0873; G06F 12/0888; G06F 2212/282; G06F 2212/6012
  USPC .......................................... 711/118, 129, 130
  See application file for complete search history.

(56) References Cited

U.S. PATENT DOCUMENTS

| 6,751,706 B2 | 6/2004 | Chauvel et al. |
| 8,627,041 B2 | 1/2014 | Glasco et al. |
| 10,067,796 B1 | 9/2018 | Metcalf |
| 10,120,800 B2 * | 11/2018 | Sivaramakrishnan ....... G06F 12/0862 |
| 2007/0260821 A1 * | 11/2007 | Zeffer ................. G06F 12/0815 711/143 |
| 2012/0221785 A1 * | 8/2012 | Chung ................. G11C 7/1006 711/105 |

* cited by examiner

*Primary Examiner* — Gary J Portka
(74) *Attorney, Agent, or Firm* — Kowert, Hood, Munyon, Rankin & Goetzel, P.C.

(57) ABSTRACT

An apparatus includes a control circuit and a cache memory with a plurality of regions. The control circuit receives a first and a second access request to access the cache memory. In response to determining that the first access request is from a particular processor core, and that the first access request is associated with a particular cache line in the cache memory, the control circuit stores the first access request in a cache access queue. In response to a determination that the second access request is received from a functional circuit, and that the second access request is associated with a range of a memory address space mapped to a subset of the plurality of regions, the control circuit stores the second access request in a memory access queue. The control circuit arbitrates access to the cache memory circuit between the first access request and the second access request.

20 Claims, 9 Drawing Sheets

USING CACHE MEMORY AS RAM WITH EXTERNAL ACCESS SUPPORT

BACKGROUND

Technical Field

Embodiments described herein are related to the field of integrated circuits, and more particularly to cache memory circuits.

Description of the Related Art

A computer system, including a system-on-chip (SoC), may include one or more processor cores that read and write information from and to one or more system memories. Access to a system memory, in some computer systems, may require multiple cycles of a processor clock signal to complete. As a mitigation to delays that may occur as a result of system memory access, computer systems may include one or more levels of cache memory to temporarily store information that is used frequently. To reduce an amount of access time to the cache memory as compared to a system memory, a cache memory may be physically located closer to a processor core, and may have a different access path that avoids, for example, a system bus that handles a variety of memory accesses from multiple sources to multiple destinations.

A cache memory may include much less storage capacity as a system memory. To maintain relevant information in the cache memory, a cache controller may evict information currently stored in the cache memory that is not used for some amount of time. By replacing information that is not used frequently, a cache memory may eventually be filled with information that is current to a particular process being performed by a processor core, thereby allowing the processor core to potentially complete the particular process in a more efficient manner.

SUMMARY OF THE EMBODIMENTS

Broadly speaking, a system, an apparatus, and a method are contemplated in which the apparatus includes a control circuit and a cache memory circuit that is configured to store a plurality of cache lines in different ones of a plurality of regions. The control circuit may be configured to receive a first access request and a second access request to access the cache memory circuit. In response to a determination that the first access request is from a processor core coupled to the control circuit, and that the first access request includes a first address associated with a particular cache line in a particular region of the plurality of regions, the control circuit may store the first access request in a cache access queue. In response to a determination that the second access request is received via a communication bus from a functional circuit, and that the second access request includes a second address that is included in a range of a memory address space mapped to a subset of the plurality of regions, the control circuit may store the second access request in a memory access queue. The subset of the plurality of regions excludes the particular region. The control circuit may be configured to arbitrate access to the cache memory circuit between the first access request and the second access request.

In a further example, the control circuit may, in response to an indication to map the subset of the plurality of regions to the range of memory address space, generate respective tags for memory locations in the subset of the plurality of regions. In another example, the control circuit may receive a third access request to access the cache memory circuit. In response to a determination that the third access request is from the processor core, and that the third access request is a read request that includes the second address, the control circuit may compare the second address with respective tag information associated with previously stored data lines stored in both the particular region and the subset of the plurality of regions to generate comparison results, and may retrieve the particular data stored in the subset of the plurality of regions using the comparison results.

In an example, the control circuit may, in response to a determination that the first access request is a read access request, retrieve previously stored data from the particular region of the plurality of regions using results of a comparison of tag information associated with the previously stored data and the first address. In one example, address values included in a remaining portion of the memory address space may be mapped to respective ones of a plurality of locations in system memory. The remaining portion of the memory address space may exclude the range of memory address space.

In an embodiment, the control circuit may include a register circuit configured to store data indicative of a starting address of the subset of the plurality of regions of the cache memory circuit that is mapped to the range of the memory address space. In a further embodiment, the control circuit may select the starting address based on address boundaries between cache ways.

BRIEF DESCRIPTION OF THE DRAWINGS

The following detailed description makes reference to the accompanying drawings, which are now briefly described.

Figure 1:
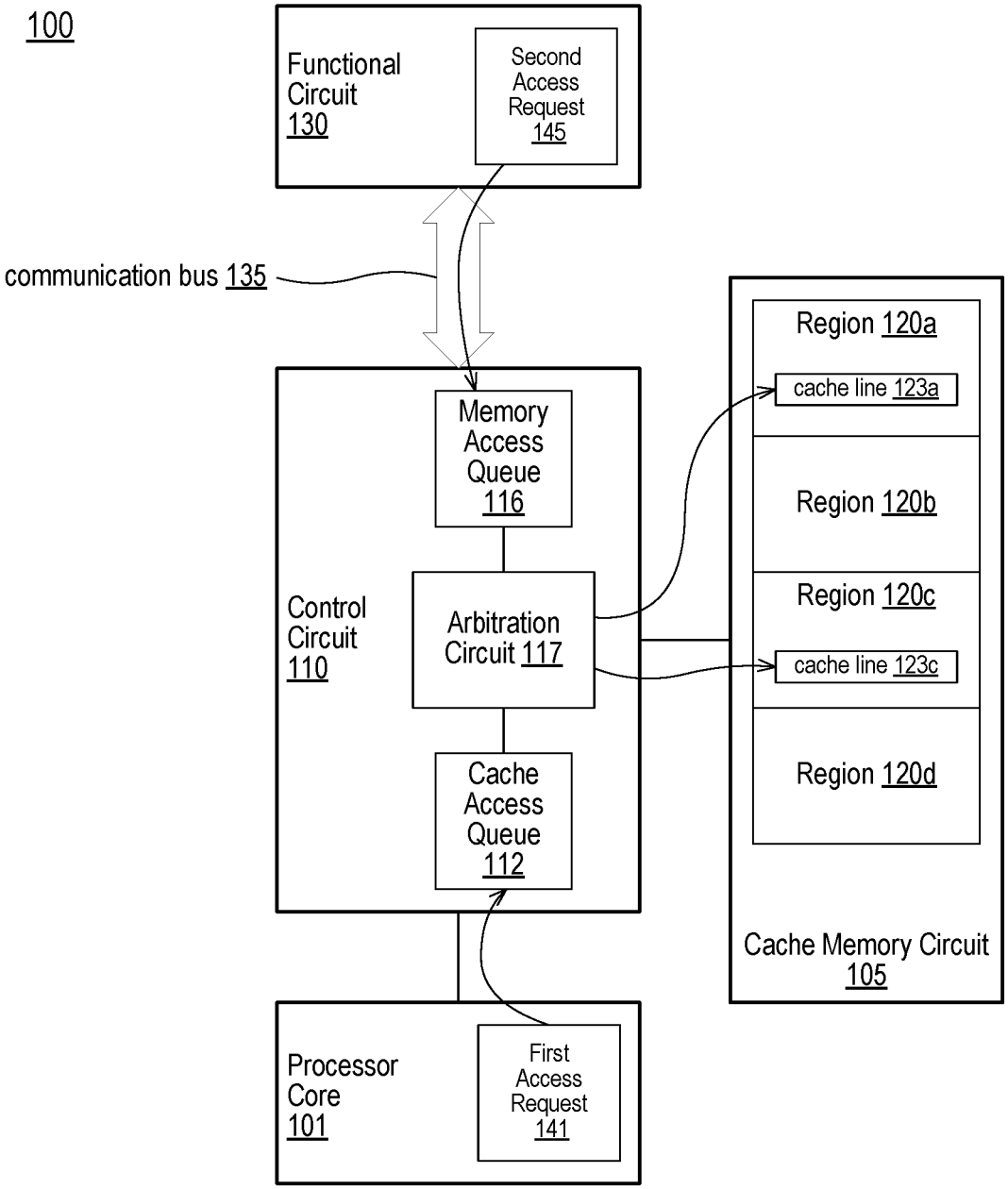
FIG. 1 illustrates a block diagram of an embodiment of a processing circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Cache memories may be utilized in a computer system to reduce access times for some memory fetches issued by a processor core. To increase a benefit of reduced access times, a cache memory may be configured to retain stored data that is accessed frequently and mark stored data that is not accessed frequently for eviction. Some processor cores, however, may perform some tasks infrequently. These infrequently performed tasks may benefit from the reduced access times enabled by the cache memory.

As an example of a benefit from reducing access times, a processor core may be enabled to respond to a particular interrupt signal by executing a corresponding interrupt service routine. As used herein, an "interrupt service routine" (or "ISR") refers to a group of processor instructions that are executed in response to detecting an assertion of a corresponding interrupt signal. Fetching the processor instructions of the ISR from a system memory, such as dynamic random access memory (DRAM), may take longer than if the instructions are stored in a cache memory supporting the processor core. Instructions of an ISR may not be stored in the cache memory unless the particular interrupt has been previously fetched. Even if the ISR has been previously fetched, unless the particular interrupt occurs frequently, the ISR may be evicted from the cache before a second assertion of the particular interrupt occurs. Fetching instructions of the ISR from the system memory, rather than from the cache memory, may increase a time for the processor core to complete the ISR and return to the interrupted task.

In another example, the processor core may be configured to perform tasks associated with operation of a high-speed communication interface, such as Bluetooth, universal serial bus (USB), Ethernet, WiFi, and the like. To transfer data via such interfaces, the processor core may be configured to process a packet header for a message that is to be sent or that has been received. Packet header information may be stored in the system memory, requiring longer fetch times to retrieve this information as compared to retrieving the packet header information from the cache memory. The longer fetch time from the system memory may slow transmit and/or receive times for the communication interface.

A method for storing and retaining particular information within a cache memory is desired. Embodiments of apparatus and methods for allocating a portion of a cache memory as random-access memory (RAM) are disclosed herein. These embodiments demonstrate apparatus and methods for allocating the portion of cache memory as RAM as well as methods for managing access to the RAM-allocated portions while continuing to operate a remaining portion of the cache memory as a cache.

A block diagram for an embodiment of a processing circuit is illustrated in FIG. 1. Processing circuit 100 includes processing core 101, cache memory circuit 105, control circuit 110, and functional circuit 130. Cache memory circuit 105 includes a plurality of regions 120a-120d (collectively referred to as regions 120). Control circuit 110 includes cache access queue 112, memory access queue 116 and arbitration circuit 117. Control circuit 110 receives first access requests 141 from processing core 101. Control circuit 110 also receives second access request 145 from functional circuit 130 via communication bus 135. Control circuit 110 may receive first access request 141 and second access request 145 in any order. In various embodiments, processing circuit 100 may be implemented as a standalone integrated circuit (IC), one of a plurality of processors in an SoC, or comprised of multiple ICs on a circuit board.

As illustrated, processing core 101 is configured to retrieve and execute instructions from cache memory circuit 105 and/or from other memories associated with processing circuit 100 (not shown). Processing core 101 may implement any suitable instruction set architecture (ISA), such as, e.g., ARM™, PowerPC®, Blackfin®, or x86 ISAs, or combination thereof. In some embodiments, processing core 101 may be a specialized core such as a floating-point processor, a digital-signal processor, or the like. Processing core 101 may be capable of executing an instruction or a portion of an instruction on each cycle of a received core clock signal.

Cache memory circuit 105, as shown, is used as a cache memory configured to store a plurality of cache lines in different ones of a plurality of regions 120. The regions 120, included in cache memory circuit 105, may correspond to physical or logical rows of memory cells or to one or more cache ways or cache lines. As illustrated, each of regions 120 corresponds to a cache way that includes a plurality of cache lines 123. For clarity, only cache lines 123a and 123c are shown within regions 120a and 120c, respectively. When a cache request does not generate a cache hit in cache memory circuit 105 (i.e., a cache miss occurs), an amount of data is read from a higher-level memory, such as the system memory, may correspond to a size of a cache line 123. In some embodiments, the size of a cache line 123 may correspond to a physical or logical row of memory cells in cache memory circuit 105, while in other embodiments, multiple rows may be included in one cache line 123.

If a cache request from processing core 101 results in a cache miss in cache memory circuit 105 (e.g., the requested information is not stored in cache memory circuit 105), then the higher-level memory may be accessed via another data path, such as communication bus 135. Communication bus 135 is configured to provide a communication conduit between various functional circuits (including, as illustrated, functional circuit 130) in processing circuit 100. Communication bus 135 includes one or more bus structures for transferring transactions between the functional circuits. As used herein, a "transaction" refers to an interaction between two distinct circuits in processing circuit 100—in some instances, a transaction may include a command or request from a first circuit, performance of that command/request by a second circuit, and a response to the command/request. A memory request, such as from processing core 101 to access the system memory is an example of one type of transaction that may be handled by communication bus 135.

Control circuit 110 is a cache controller circuit configured to manage cache requests from processing core 101 to cache memory circuit 105, as well as managing memory requests to the higher-level memories in response to a cache miss. As illustrated, control circuit 110 is also configured to receive memory requests generated from functional circuits other than processor core 101, such as functional circuit 130. Control circuit 110 receives cache requests from processing core 101, and receives memory requests via communication bus 135, for example, from functional circuit 130. Control circuit 110 allocates a first portion of regions 120 as the cache for fulfilling cache requests from processing core 101, and allocates a second portion of regions 120 as memory-mapped RAM to fulfill memory requests from the functional circuits other than processing core 101.

Control circuit 110 determines which of regions 120 will be used as the cache memory for processing core 101 and which will be used as memory-mapped RAM. For example, control circuit 110 may include one or more registers that identify regions 120a and 120b are allocated to cache memory, while regions 120c and 120d are allocated to memory-mapped RAM. In various embodiments, the resolution for regions 120 may correspond to a number of physical or logical rows of cache memory circuit 105, or to a number of cache lines or cache ways that are mapped to cache memory circuit 105. As illustrated, each region corresponds to a cache way.

As used herein, "memory-mapped RAM" refers to RAM locations that are mapped to a system address space. Memory-mapped RAM may, therefore, be accessed by any functional circuit coupled to a system communication bus. A memory request may use memory-mapped RAM as a final memory destination, also referred to herein as an "endpoint" destination, for the information included in the memory request. In some cases, the location in the memory-mapped RAM may store an only copy of information associated with the memory request.

Cache memory is used to store a local copy of a memory location that is mapped in a system address space. A cache memory entry is accessed using a system address for the memory location. A change to information stored in a cache memory entry may result in a write-back request to update the corresponding information stored in the memory location at the system address.

As illustrated, control circuit 110 receives first access request 141 and second access request 145 to access cache memory circuit 105. First access request 141 is a cache request from processing core 101 to access the cache portion of cache memory circuit 105. In response to a determination that first access request 141 is from processor core 101, and that first access request 141 includes a first address associated with a particular cache line in a particular region of the plurality of regions (e.g., cache line 123a in region 120a), control circuit 110 is configured to store first access request 141 in cache access queue 112. When first access request 141 is processed, control circuit 110 determines whether a cache line 123 in the cache portion of cache memory circuit 105 corresponds to the first address included in first access request 141. If the first address does result in a cache hit to a respective cache line 123, then first access request 141 is fulfilled using the respective cache line 123. Otherwise, control circuit 110 indicates that a cache miss occurred and the first access request 141 is sent as a memory request to a higher level memory, for example, to the system memory via communication bus 135.

In response to a different determination that second access request 145 is received via communication bus 135 from functional circuit 130, and that second access request 145 includes a second address that is included in a range of a memory address space mapped to a subset of the plurality of regions (e.g., those regions that are not acting as a cache for processor core 101), control circuit 110 is configured to store second access request 145 in memory access queue 116. Second access request 145 is a memory request from functional circuit 130 to access the memory portion of cache memory circuit 105. Control circuit 110 accepts second access request 145 in response to determining that the second address corresponds to a location in the currently allocated memory portion. When second access request 145 is processed, control circuit 110 fulfills the request using the corresponding locations in the memory portion.

Control circuit 110 may store a number of requests in each of cache access queue 112 and memory access queue 116. Each of cache access queue 112 and memory access queue 116 may correspond to a queue, a buffer, or other type of memory circuit. The stored requests in each queue may be organized in a "first in, first out" (FIFO) manner, by ages of the requests, by addresses included in the requests, or by another organizational scheme. Control circuit 110 uses arbitration circuit 117 to arbitrate access to cache memory circuit 105 between first access request 141, received from processing core 101, and second access request 145, received from functional circuit 130 via communication bus 135.

Arbitration between cache requests in cache access queue 112 and memory requests in memory access queue 116 may be based on a variety of criteria. For example, memory requests may generally be prioritized over cache requests. Since cache requests are for information that is ultimately maintained in a higher-level memory, a copy of the information is stored at a location outside of cache memory circuit 105, and the access to the information stored in a corresponding cache entry may not be critical. Memory requests, in contrast, are directed to a storage end-point and the information being accessed may not have a copy stored elsewhere in processing circuit 100. Maintaining forward progress (e.g., making progress towards fulfilling a memory request) for such memory requests may be desired to avoid losing data or causing a memory block in which subsequent tasks are unable to proceed until the memory request has been fulfilled.

Other criteria may also be used to arbitrate between the memory and cache requests. An amount of time spent waiting in a queue may be used to identify a cache or memory request that has been stored in a queue for an extended amount of time and may then be prioritized to move the stalled request forward in the queue. In some embodiments, memory requests and/or cache requests may include a priority indicator, which can then be used for selecting a request to fulfill.

To fulfill a cache request, such as first access request 141, control circuit 110 determines whether first access request 141 is a read request or a write request. If a cache read request is received, then control circuit 110 further determines if an address included in the cache read request corresponds to an existing cache tag. If a cache tag corresponding to the address in the request does exist, then a corresponding cache line is accessed and one or more data words corresponding to the address are read and sent back to processing core 101. Otherwise, the cache request is considered a cache miss and the read request may be sent to a higher-level memory, such as a system memory accessed via communication bus 135. When the requested information is returned from the system memory, a cache tag may be created based on the address. One or more data words received from the higher-level memory, as well as the created cache tag, are stored in a corresponding cache line.

If first access request 141 is a cache write request, then control circuit 110 is configured to determine whether a cache tag corresponding to an address included in the cache write request exist. If not, then the cache request is treated as a cache miss and the write request is sent to a higher-level memory. Otherwise, a cache line corresponding to an identified cache tag is accessed and one or more data words to be written are stored at a location in the cache line that corresponds to the address. The cache tag associated with the entry may, in some embodiments, be updated to indicate that data in the cache line has been updated. In addition, since the cache allocated portion of cache memory circuit 105 is not an end-point destination for the one or more data words, control circuit 110 may issue a write-back memory request to the higher-level memory to update the end-point destination with the new data.

Processing core 101 and control circuit 110, as shown, are physically coupled by an interface that is different from communication bus 135. In some embodiments, processing core 101 and control circuit 110 may communicate via one or more shared circuit nodes, that allow for lower memory access times for cache requests issued by processing core 101 than a memory request that is sent out to a system memory (not shown in FIG. 1) via communication bus 135, for example.

To fulfill a memory request, such as second access request 145, control circuit 110 determines whether the second access request 145 is a read or write request. If a read request is received, then control circuit 110 accesses a location in the memory-mapped portion of cache memory circuit 105, including regions 120c and 120d, that corresponds to an address included in second access request 145. One or more data words are read from the location, and returned to functional circuit 130. If a write request is received, then control circuit 110 stores one or more data words included in the write request to the location in the memory-mapped regions 120c and 120d that corresponds to the address included in second access request 145. Since the locations included in the memory-mapped portion of cache memory circuit 105 are end-point destinations, write-back memory requests are not issued.

In some embodiments, control circuit 110 is further configured to, in response to an indication to map the subset of the plurality of regions to the range of memory address space, generate respective tags for memory locations in the subset of the plurality of regions, e.g., regions 120c and 120d. Using, for example, a state machine circuit, control circuit 110 may generate cache tags for all cache lines in regions 120c and 120d when these regions are initially allocated to the memory-mapped portion. In some embodiments, control circuit 110 may store the cache tags in cache memory circuit 105. In other embodiments, the cache tags may be stored in a separate memory circuit within control circuit 110. The cache tag may allow processing core 101 to access data stored in the memory-mapped portion of cache memory circuit 105 by using cache requests. In some embodiments, cache tags may not be generated when regions 120c and 120d are initially mapped to the range of memory address space. In such embodiments, control circuit 110 may, generate a cache tag corresponding to cache line 123c in response to a first write to an address mapped to cache line 123c.

It is noted that as used herein, a "data word" refers to a number of bits of data that are read, written, or otherwise accessed as one unit of data. In various embodiments, a data word may be any suitable number of bits, 8, 16, or 32. In some embodiments, additional bits may be included in a data word, resulting in data words that are 10, 11, 19, or 35 bits long, for example.

By partitioning a processor core's cache memory circuit into a cache memory portion and a memory-mapped portion, functional circuits other than the processor core may be capable of accessing the memory-mapped portion. The processor core may access both portions of the cache memory circuit faster than other memory circuits, such as a system memory. A different functional circuit may, therefore, preload data or instructions into the memory-mapped locations for future use by the processor core. For example, the different functional circuit may store data corresponding to a received data packet to the memory-mapped portion of the cache memory circuit, thereby allowing the processor core to reduce an amount of time for processing the received data packet.

It is noted that the processing circuit illustrated in FIG. 1 is merely one example for demonstrating disclosed concepts. Only functional blocks needed to illustrate these concepts are included in FIG. 1.

FIG. 1 shows an embodiment with a processing core, control circuit, and memory circuit. FIG. 1 illustrates how a control circuit may manage a memory circuit for use as both a cache memory and memory-mapped RAM. Such control circuits may be implemented in a variety of designs. Elements of one such design are disclosed in FIG. 2.

Figure 2:
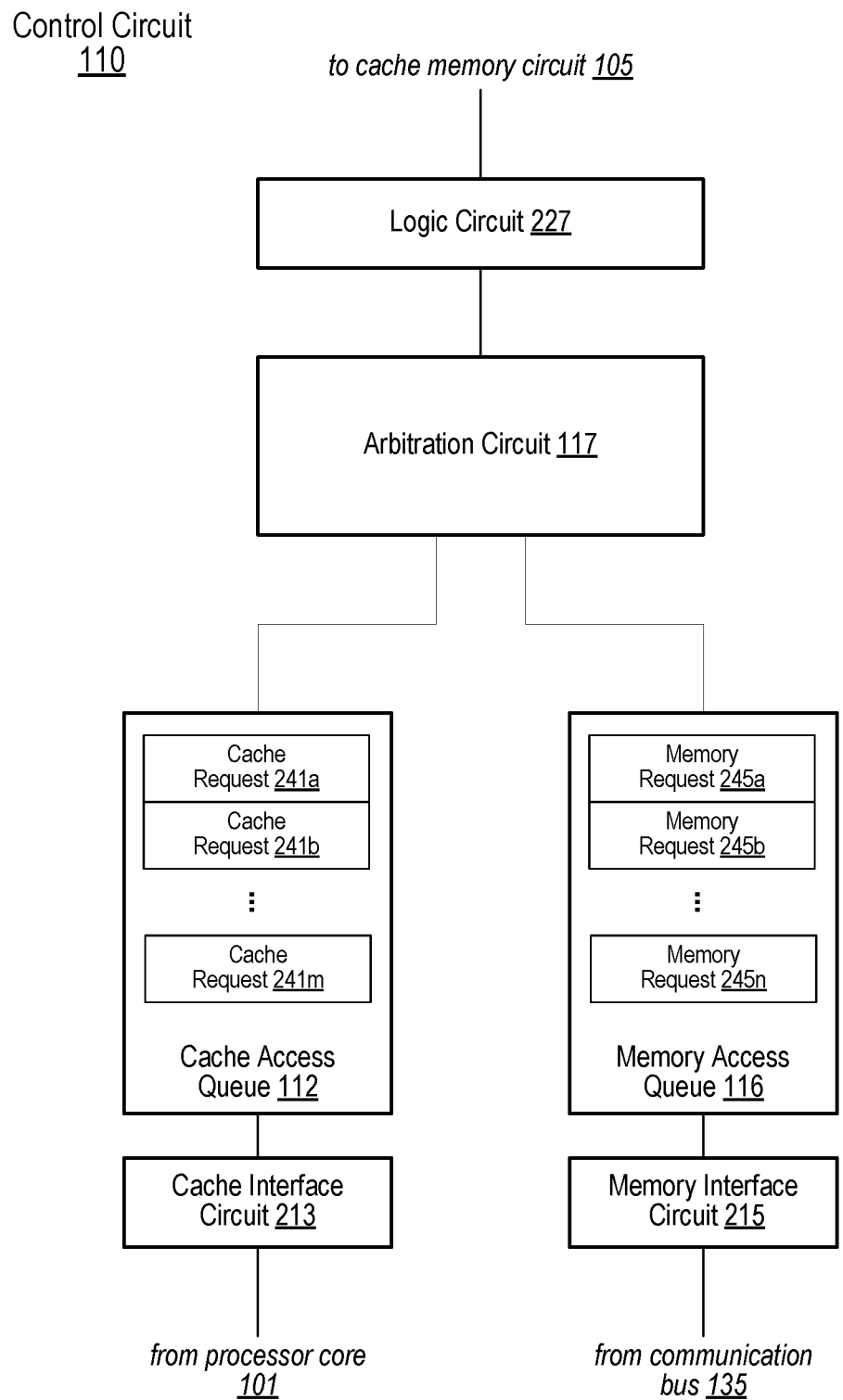
FIG. 2 depicts a block diagram of an embodiment of a control circuit utilized in the processing circuit of FIG. 1.

Moving to FIG. 2, an embodiment of control circuit 110 from FIG. 1 is shown. Control circuit 110 includes cache interface circuit 213, memory interface circuit 215, cache access queue 112, memory access queue 116, arbitration circuit 117, and logic circuit 227. Cache interface circuit 213 is coupled to processing core 101, and memory interface circuit 215 is coupled to communication bus 135. In addition, logic circuit 227 is coupled to cache memory circuit 105.

As illustrated, cache interface circuit 213 is configured to receive, from processing core 101, cache requests 241 (shown as cache requests 241a-241m, where 'm' may refer to any suitable number of requests) for a cache portion of cache memory circuit 105. Cache interface circuit 213 receives cache requests 241 and stores this plurality of cache requests in cache access queue 112.

Memory interface circuit 215, as shown, is configured to receive, from communication bus 135, memory requests 245

(illustrated as memory requests 245a-245n where 'n' may refer to any suitable number of requests, independent of the number of cache requests 241) for a different, memory-mapped portion of cache memory circuit 105. In a similar manner as cache interface circuit 213, memory interface circuit 215 receives memory requests 245 and stores this plurality of memory requests in memory access queue 116. Cache access queue 112 and memory access queue 116 may be implemented as any suitable type of memory structure. For example, in one embodiment, both queues may be implemented as a plurality of register circuits, while in other embodiments, cache access queue 112 and memory access queue 116 may be implemented as software data structures in a common RAM circuit.

Arbitration circuit 117 is configured to arbitrate access to cache memory circuit 105 between a particular one of cache requests 241 and a particular one of memory requests 245. In some embodiments, a round-robin arbitration technique may be employed to select between cache access queue 112 and memory access queue 116. Arbitration circuit 117, or other circuits in control circuit 110 such as logic circuit 227, may prioritize cache requests 241 within cache access queue 112, as well as prioritizing memory requests 245 within memory access queue 116. Prioritizing the respective orders of cache requests 241 and memory requests 245 may be based on any suitable criteria, such order of arrival of each request, an age of each request, a type of request (e.g., a read may be prioritized over a write, or vice versa), a priority value included with the request, and the like. In some embodiments, a round-robin approach may be used to order memory requests within memory access queue 116 based on a functional circuit that issued the respective memory request. In a similar manner, a round-robin approach may also be used to order cache requests within cache access queue 112 based on a processing thread that issued the respective cache request.

Arbitration circuit 117, as shown, compares a highest priority one of cache requests 241 to a highest priority one of memory requests 245, and selects one to fulfill using cache memory circuit 105. Arbitration circuit 117 may include various combinations of logic gates, latching circuits, and other circuit elements to form one or more state machines or other type of control circuit for performing the described functions. In some embodiments, arbitration circuit 117 may prioritize memory requests 245 over cache requests 241.

In some embodiments, control circuit 110 may enforce forward-progress guarantees on memory requests 245 over cache requests 241, even if a round-robin procedure, or other type of arbitration process is utilized. Without a forward-progress guarantee, a deadlock scenario may occur in which a memory request is blocked behind an outstanding cache request that generates another memory request on communication bus 135. A potential circular dependency can occur in which a particular memory request 245 is waiting for a particular cache request 241 to proceed, but the particular cache request 241 has generated an outstanding memory request to communication bus 135. The outstanding memory request, however, may be blocked behind the particular memory request 245, creating a circular dependency and a deadlock situation in which neither the particular memory request 245 nor the outstanding memory request associated with the particular cache request 241 can move forward. By enforcing a forward-progress guarantee, the particular memory request 245 may be prioritized ahead of the outstanding memory request, allowing the particular memory request 245 to maintain forward-progress towards completion.

As an example of prioritizing memory requests, cache memory circuit 105 may correspond to a level 2 (L2) cache memory. A corresponding L1 cache within processing core 101 may issue a serial cache request to copy data to the cache portion of cache memory circuit 105. While this cache request is being fulfilled, arbitration circuit 117 may detect that a new memory request has been stored in memory access queue 116. In response to the new memory request, arbitration circuit 117 may pause the serial cache request to allow the new memory request to complete. The serial cache request may be resumed after the memory request has been completed. Since the data associated with the serial cache request is already stored in the L1 cache, and is accessible to processing core 101, the serial cache request can be interrupted with little or no impact to the performance of processing core 101. A memory request to cache memory circuit 105, in contrast, may not have a copy of the data associated with the request stored elsewhere, hence a desire to maintain forward progress of the memory request. Accordingly, completing the memory request may be prioritized over a cache request in order to save the data more quickly.

If cache access queue 112 is full when a new cache request is received, then cache interface circuit 213 may assert a respective indication to processing core 101. This assertion may cause the new cache request to be sent to a retry queue, such as a retry queue in an L1 cache memory in processing core 101. Similarly, if memory access queue 116 is full when a new memory request is received, then the new memory request may be re-routed into a retry queue within communication bus 135.

In some embodiments, logic circuit 227 may perform various tasks attributed to control circuit 110. Logic circuit 227 may be implemented using various combinations of sequential logic, combinational logic, and other types of circuit elements to form a control circuit for performing the disclosed tasks. As illustrated, logic circuit 227 may provide an interface and control signals to fulfill cache and memory requests using cache memory circuit 105. Logic circuit 227 may perform the prioritization of cache requests 241 in cache access queue 112 and the prioritization of memory requests 245 in memory access queue 116. When either cache access queue 112 or memory access queue 116 are full, logic circuit 227 may perform the task of sending newly received requests to respective retry queues or otherwise blocking reception of additional requests.

Control circuit 110 of FIG. 2 is one example of an embodiment of a control circuit for managing a memory circuit as disclosed herein. Other embodiments may include additional or different circuits for implementing the described concepts.

The descriptions above describe partitioning a plurality of regions of a memory circuit into a memory-mapped portion and a cache portion. Various methods may be employed to perform this allocation. Two such procedures are described below in FIGS. 3 and 4.

Figure 3:
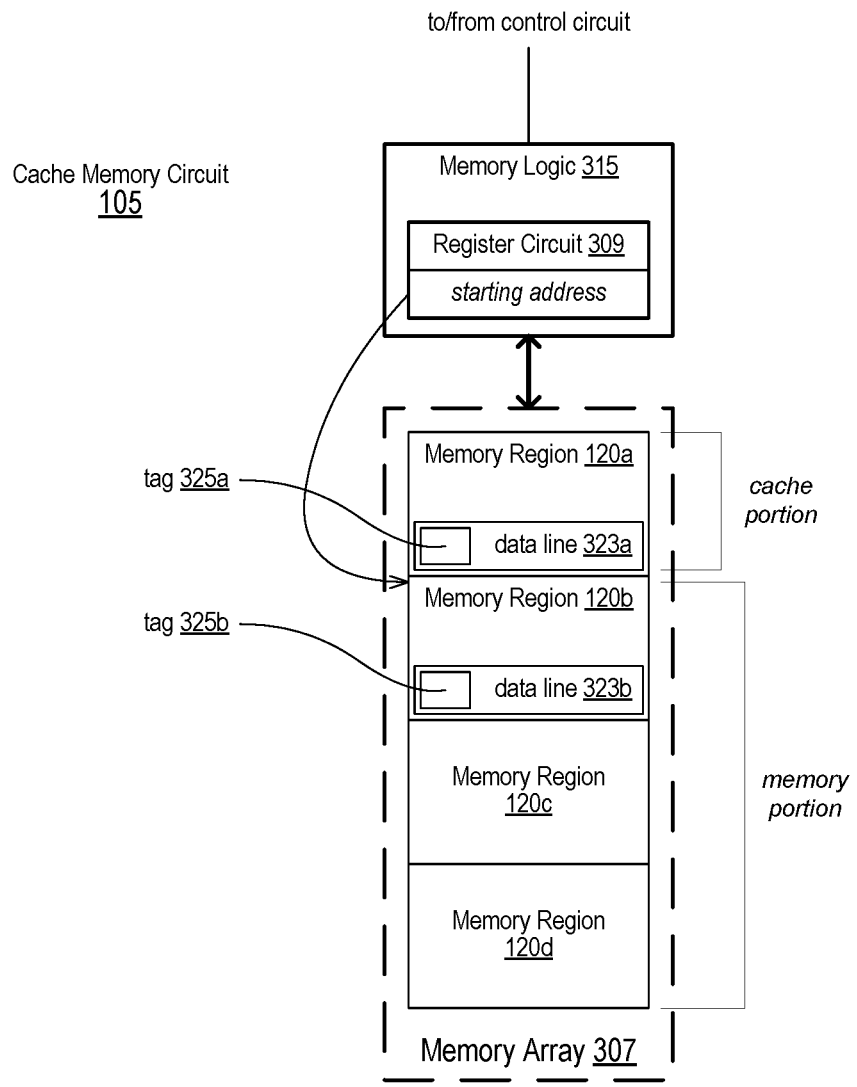
FIG. 3 presents an embodiment of a cache memory circuit included in the processing circuit of FIG. 1.

Turning to FIG. 3, an embodiment of a cache memory circuit with a memory allocation register circuit is depicted. Cache memory circuit 105 is an example implementation for the cache memory circuit shown in FIG. 1. As shown, cache memory circuit 105 includes memory array 307 and memory logic 315. Memory array 307 includes memory region 120a through memory region 120d (collectively memory regions 120). Memory logic 315 includes register circuit 309.

Memory array 307, as shown, is partitioned into memory regions 120. In some embodiments, each memory region 120 may correspond to a physical division of memory array 307, such as respective banks, arrays, sub-arrays, pages, or rows of memory cells. In other embodiments, each memory region 120 may correspond to a logical group of memory cells, such as a particular range of addresses with no dependence on a physical boundary.

As illustrated, memory array 307 is used as a cache memory for processing core 101. The locations in memory array 307 are divided into a plurality of cache ways, each cache way including a plurality of data lines 323. For clarity, only data line 323*a* in region 120*a* and 323*b* in memory region 120*b* are illustrated. A data line 323 may be single row of memory cells in memory array 307, and a cache line may include one or more data lines 323. As used herein, a "cache line" corresponds to a number of consecutive memory locations referenced by a single cache tag. A "cache way," as used herein corresponds to a set of cache lines that share a common index value. All system addresses of a main system memory can be mapped to a single cache way. Having more than one cache way, therefore, allows data from a particular system address to be stored in more than one respective cache line.

By having a particular number of cache ways, each system address in the main system memory may be mapped to a same particular number of cache lines. Algorithms used to map a system address to a particular cache line are varied for each cache way such that two system address that map to a same cache line in a first cache way map to different cache lines in a second cache way, thereby decreasing a chance of a collision occurring. A collision may occur when two or more different addresses are mapped to a same cache line. With a single cache way, also referred to as direct mapping, if data from a first address has been stored in a particular cache line, then if a second address maps to the particular cache line, either the data from the first address must be evicted or data from the second address cannot be cached. If a second cache way is implemented, then the second address may be mapped to a cache line in the second cache way to which the first address may not map.

In some embodiments, each of memory regions 120*a*-120*d* may correspond to respective cache ways. By using cache ways, as long as one cache way is allocated to cache memory, cache memory circuit 105 may be used to cache data associated with any address within the main system memory. A reduction of the number of cache ways may, however, increase chances of a collision in the cache memory. In some embodiments, a minimum amount of the memory cells may always be allocated to cache memory to ensure that cache memory circuit 105 is capable of functioning as a cache memory. This minimum amount of memory may correspond to one cache way. An amount of memory cells included in the minimum amount of memory allocated to the cache may be based on another cache memory coupled to processing core 101. For example, if cache memory circuit 105 is an L2 cache, and an L1 cache is included in processing core 101, then a minimum size for the cache portion of cache memory circuit 105 may be equal to or greater than the size of the L1 cache. If the cache portion is at least equal in size to the L1 cache, then the cache portion may be inclusive with the L1 cache. In other words, the cache portion may store a copy of all the same data that is stored in the L1 cache.

As illustrated, memory logic 315 may perform various tasks attributed to cache memory circuit 105. Memory logic 315 may be implemented using various combinations of combinational logic, sequential logic, and other types of circuit devices to form a control circuit for performing the operations associated with cache memory circuit 105. Memory logic 315 may provide an interface and control signals to communicate with control circuit 110 in order to read and write locations in memory array 307 in response to received access requests.

Memory logic 315 includes register circuit 309. Register circuit 309, as illustrated, is a register that stores a value corresponding to one of memory regions 120*a*-120*d*. To allocate a cache portion and a memory-mapped portion of memory regions 120, control circuit 110 may store, in register circuit 309, a value indicative of a beginning location of the memory-mapped portion. Control circuit 110 may receive from a processing circuit, such as processing core 101, a starting address value that is then sent to memory logic 315 and stored in register circuit 309. The starting address value, as shown, identifies memory region 120*b*. As a result, memory regions 120*b*-120*d* are allocated to the memory-mapped portion of cache memory circuit 105, while the remaining memory region 120*a* is allocated to cache memory for processing core 101.

As shown, cache tags, such as tags 325*a* and 325*b*, may be included in all or a portion of data lines 323. Tags 325*a* and 325*b* may include an address value, corresponding to a portion or a hash value of a system address. In some embodiments, tags 325*a* and 325*b* may include additional information regarding a state of data stored in the corresponding data line 323, such as data valid or dirty bits that indicate if the data stored in the respective data line is valid or if the system address has been written to at a different level of memory (i.e., in an L1 cache or in the system memory). In the cache portion of memory array 307, tag 325*a* may include a value corresponding to a system address in the main system memory, external to memory array 307. In the memory-mapped portion of memory array 307, tag 325*b* may include a value corresponding to a system address within a range of system address values that correspond to memory regions 120*b*-120*d*.

Partitioning memory array 307 between a cache portion and a memory-mapped portion is enabled by a single address in the embodiment of FIG. 3. Other techniques may be employed to partition a plurality of memory regions into cache portions and memory-mapped portions. One additional technique is depicted in FIG. 4.

Figure 4:
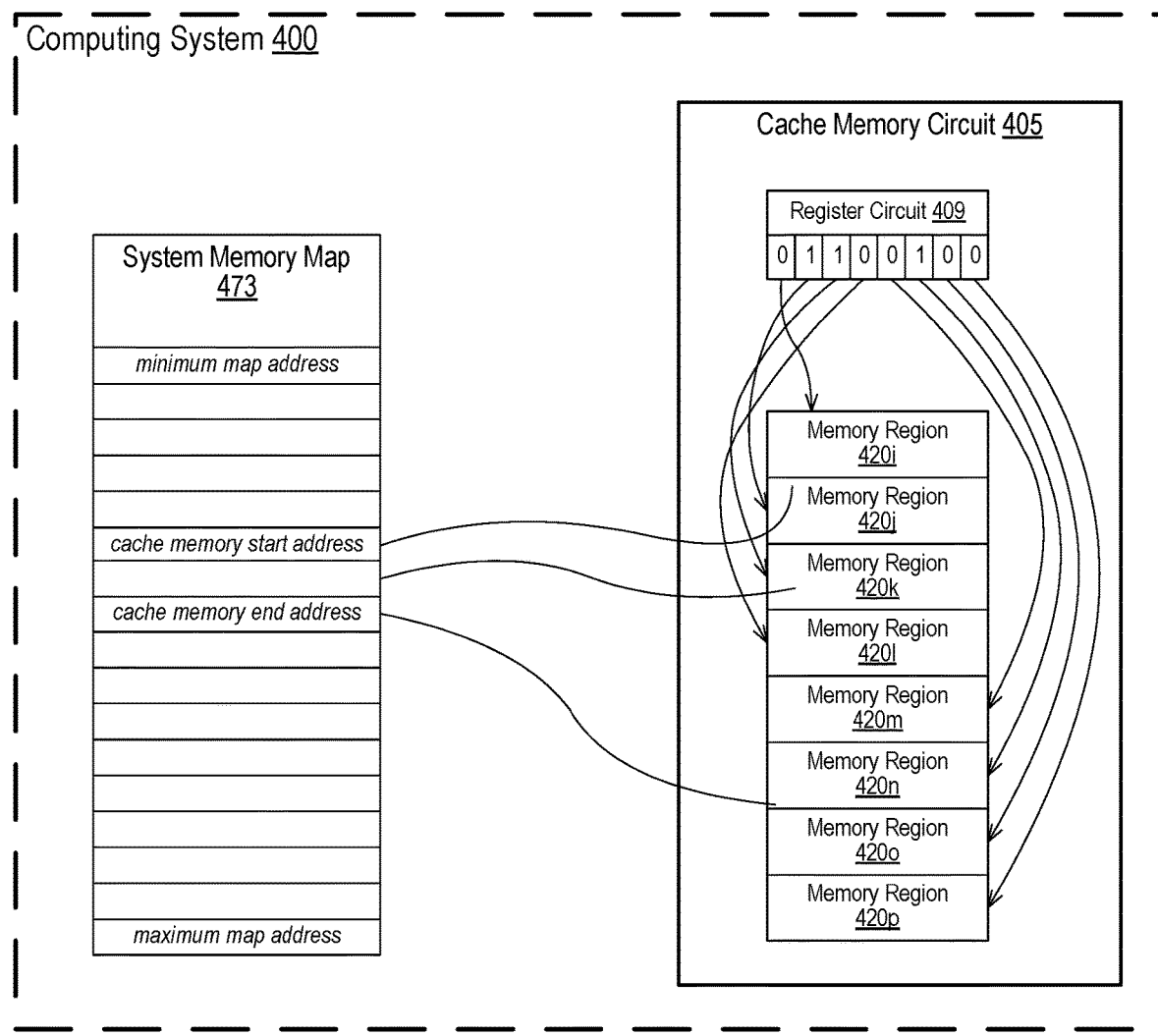
FIG. 4 depicts an embodiment of a computing system that includes a cache memory circuit and a system memory map.

Proceeding to FIG. 4, an embodiment of a computing system is illustrated. Computing system 400 includes a different embodiment of a cache memory circuit along with an embodiment of a system memory circuit. Cache memory circuit 405 includes memory region 420*i* through memory region 420*p* (collectively, memory regions 420). Cache memory circuit 405 further includes register circuit 409. FIG. 4 also includes an embodiment of system memory map 473.

Cache memory circuit 405 demonstrates another implementation for allocating a cache memory circuit between a cache portion and a memory-mapped portion. Memory regions 420*i*-420*p*, like memory regions 120*a*-120*d*, may also correspond to any suitable division of the memory cells in cache memory circuit 405, including, as illustrated, respective cache ways. While register circuit 309 in FIG. 3 utilized a system address value to allocate between a cache portion and a memory-mapped portion, register circuit 409 includes a number of data bits in which each data bit corresponds to one of memory regions 420*i*-420*p*. As shown, a value of '0' allocates the corresponding memory region to the cache portion while a value of '1' allocates the corresponding memory region to the memory-mapped portion. As shown in FIG. 4, memory regions 420*i*, 420*l*, 420*m*, 420*o*, and 420*p* are allocated to the cache portion, while memory regions 420*j*, 420*k*, and 420*n* are allocated to the memory-mapped portion. Use of register circuit 409 in cache memory circuit 405 may allow for more flexibility in allocating the memory regions than register circuit 309.

In various embodiments, system memory map 473 may be maintained in a system memory circuit or elsewhere in computing system 400, such as in communication bus 135 in FIG. 1. As illustrated, system memory map 473 indicates a mapping between system addresses and the physical memory location within computing system 400 corresponding to the system address. When one or more locations in cache memory circuit 405 are allocated to a memory-mapped portion, system memory map 473 is updated to include system address ranges corresponding to the memory regions 420 that are allocated to the memory-mapped portion. As illustrated in FIG. 4, consecutive address ranges, starting with cache memory start address through cache memory end address, are mapped to memory regions 420*j*, 420*k*, and 420*n*. Any transaction that is issued by a functional circuit in computing system 400 to a system address within the range between cache memory start address through cache memory end address, inclusive, will result in a memory request being sent to cache memory circuit 405. It is noted that a similar process may be enacted with the embodiment of FIG. 3 to map memory regions 120*b*, 120*c*, and 120*d* to a system memory map.

It is noted that FIGS. 3 and 4 merely illustrate two of a variety of possible implementations for a cache memory circuit that is compatible with the disclosed concepts. Other embodiments may include different techniques for partitioning memory regions to either cache portions or memory-mapped portions. A different number of memory regions may be included in some embodiments.

FIGS. 1-4 illustrate various embodiments of a processing circuit, a control circuit, and cache memory circuits. The concepts disclosed above may be applied to a computing system that includes multiple cores and memory circuits. An example of such a system is depicted in FIG. 5.

Figure 5:
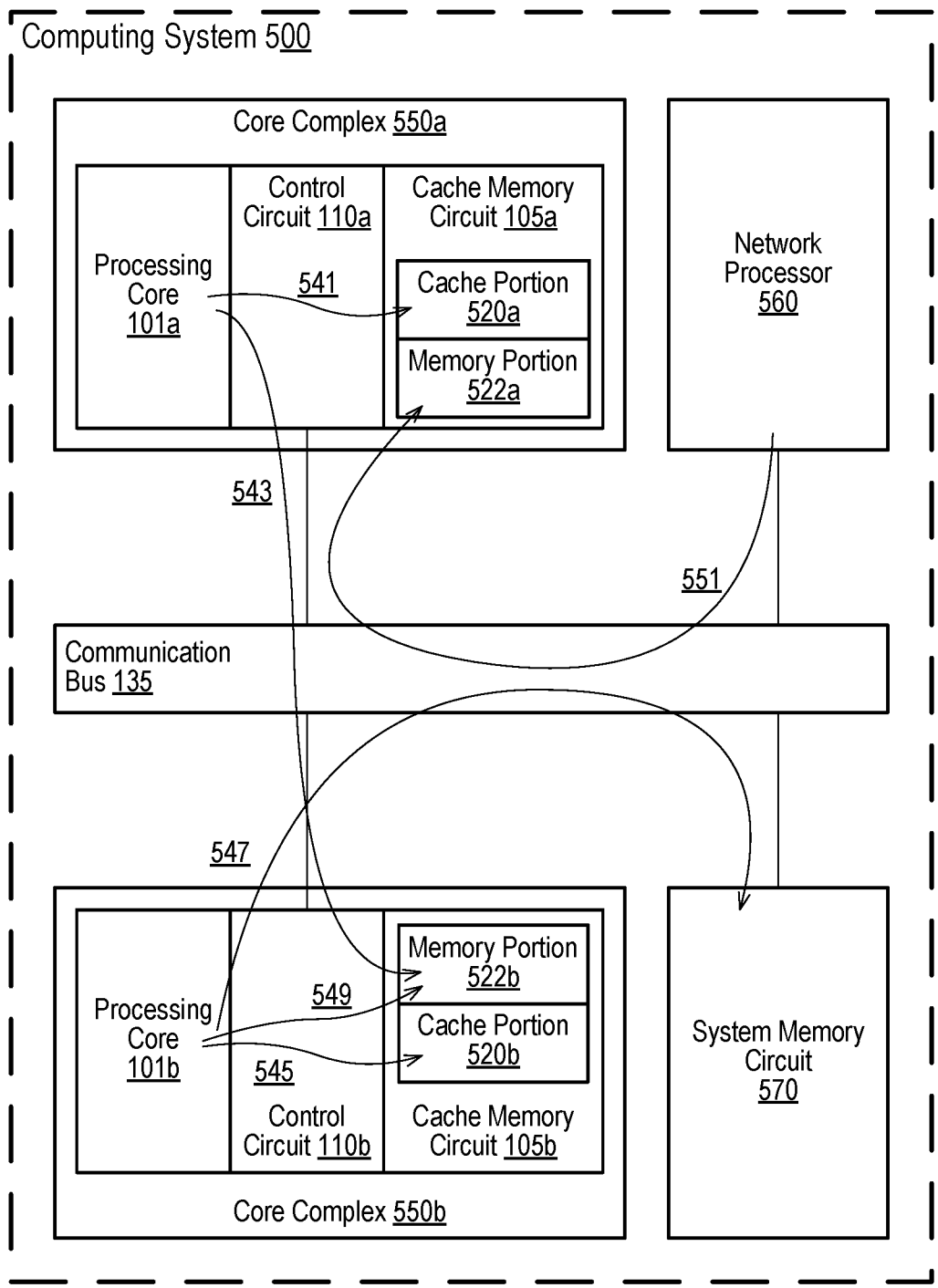
FIG. 5 shows a block diagram of an embodiment of a computing system with two core complexes, each core complex including a respective cache memory circuit.

Moving now to FIG. 5, an embodiment of a computing circuit with multiple core complexes is shown. Computing system 500 includes core complexes 550*a* and 550*b* (collectively referred to as core complexes 550), each coupled to communication bus 135. Communication bus 135 is further coupled to network processor 560 and system memory circuit 570. Core complexes 550 each include respective processing cores 101*a* and 101*b*, control circuits 110*a* and 110*b*, and cache memory circuits 105*a* and 105*b*. In various embodiments, computing system 500 may be implemented as an SoC on a single IC or as several ICs included on a circuit board.

As shown, each of core complexes 550 include circuits such as described above in regards to FIGS. 1-4. Each of cache memory circuits 105*a* and 105*b* include respective pluralities of regions that have been allocated into cache portion 520*a* and memory portion 522*a* for cache memory circuit 105*a* and into cache portion 520*b* and memory portion 522*b* for cache memory circuit 105*b*. Network processor 560 is a coprocessor that is configured to process packets of data to be sent or that have been received via a network interface. In some embodiments, network processor 560 may include circuits similar to core complexes 550, such as one or more cores, cache memories including cache controllers, and the like. Network processor 560 is capable of sending and receiving memory requests. System memory circuit 570 includes a system memory management controller and may also include memory such as static random-access memory (SRAM) as well as interfaces for accessing DRAM circuits.

Computing system 500 illustrates how various processing cores may access cache memory circuits 105 utilizing the disclosed concepts. Processing core 101*a*, for example, accesses cache memory circuit 105*a* by sending cache request 541 to cache memory circuit 105*a* to access cache portion 520*a*. Cache request 541 may correspond to a read request for data included at a particular address in system memory circuit 570. This read request is received by control circuit 110*a* before being sent to system memory circuit 570 to see if a local copy of the data corresponding to the particular address is cached in cache portion 520*a*. If a cached version is available, then control circuit 110*a* fulfills cache request 541 using the local copy, thereby completing faster than if the read request is forwarded, via communication bus 135, to system memory circuit 570.

Processing core 101*a* may also issue memory request 543 to write data to an address located in memory portion 522*b* in core complex 550*b*. For example, processing core 101*a* may preload instructions and/or data into memory portion 522*b* for future use by processing core 101*b*. Preloading instructions and/or data into cache memory circuit 105*b* may provide processing core 101*b* with faster access to this information as compared to retrieving the same information from system memory circuit 570. Such a preload technique may be used to store program code, such as an interrupt service routine, or data, such as a data packet header, in cache memory circuit 105*b* to reduce processing time associated with a particular interrupt or a particular data packet reception.

Memory request 543 may be generated by processing core 101*a* in a similar manner as cache request 541. Control circuit 110*a*, therefore, may determine if a local copy of the addressed data is cached in cache portion 520*a* before forwarding the request to communication bus 135. Upon determining that a cached tag corresponding to the requested address does not exist, control circuit 110*a* issues memory request 543 to communication bus 135.

As illustrated, communication bus 135 maintains a system memory map for computing system 500, and therefore, is able to determine that the address for memory request 543 corresponds to a location in memory portion 522*b* in cache memory circuit 105*b*. Communication bus 135 forwards memory request 543 to control circuit 110*b* which, in turn, accesses the addressed location in memory portion 522*b* and writes new data included in memory request 543 into the location.

It is noted that control circuit 110*a* receives cache request 541 and memory request 543 via a cache interface coupled to processing core 101*a*, such as cache interface circuit 213 in FIG. 2. Control circuit 110*a*, however, sends memory request 543 to communication bus 135 via a memory interface, such as memory interface circuit 215 in FIG. 2. Similarly, control circuit 110*b* receives memory request 543 from communication bus 135 via a memory interface.

Processing core 101*b*, in a similar manner, accesses cache portion 520*b* by issuing cache request 545 to control circuit 110*b* via a cache interface. Cache request 545 may corresponds to a read or write request for an address of a location in system memory circuit 570. If a cache tag exists for an address in cache request 545 (e.g., a cache hit occurs), then control circuit fulfills cache request 545 using cache portion 520*b*, potentially reducing an amount of time to fulfill the request. Processing core 101*b* also issues memory request 547 to access a system address that corresponds to a location in system memory circuit 570. In this case however, a cache tag corresponding to the different address is not found by control circuit 110b, and therefore, memory request 547 is sent to communication bus 135 which then forwards the request to system memory circuit 570 to be fulfilled.

As illustrated, processing core 101b may also issue cache request 549 to access an address in memory portion 522b. Control circuit 110b receives cache request 549 and determines that the address corresponds to memory portion 522b. In some embodiments, control circuit 110b determines that a cache tag exists for the corresponding address in memory portion 522b. For example, control circuit 110b may create cache tags for each cache line and cache way in memory portion 522b when these portions of cache memory circuit 105b are initially allocated to memory portion 522b. Control circuit 110b identifies the location in memory portion 522b by comparing an address in cache request 549 to the cache tags. In other embodiments, however, control circuit 110b may not use cache tags to identify the location in memory portion 522b. Instead control circuit 110b may include address logic for decoding the locations included in memory portion 522b.

Network processor 560, as shown, corresponds to a processing circuit that is configured to process communication data packets, for example, to send or after receiving via a wireless interface, such as a Bluetooth transceiver. Using one or more memory requests such as memory request 551, network processor 560 may, write a received data packet to memory portion 522a, allowing processing core 101a to read the received data packet without having to spend additional time reading the packet from system memory circuit 570. Processing core 101a may also store a data packet to be sent in memory portion 522a, allowing network processor 560 to issue memory requests 551 to read the packet from memory portion 522a. In some embodiments, only a header for a data packet may be sent to or received from memory portion 522a by network processor 560. For example, after receiving a data packet, network processor 560 may store the header information in memory portion 522a using memory request 551. Processing core 101a may receive a interrupt or other type of indication that a packet has been received by network processor 560. Processing core 101a may then access the header information for the received packet and be able to make a decision regarding the data packet, such as prioritizing when the received data packet will be further processed.

It is noted that each of core complexes 550 are shown with a single processing core 101. In other embodiments, additional processing cores 101 may be included in either core complex 550. These additional processing cores 101 may share access to a control circuit 110 and a cache memory circuit 105. For example, core complex 550a may include processing core 101c in addition to processing core 101a. Both processing cores 101a and 101c share access to control circuit 110a and therefore can access both cache portion 520a and memory portion 522a using cache requests like cache request 541. In addition, both processing cores 101a and 101c can access memory portion 522b in cache memory circuit 105b using memory requests such as memory request 543.

FIGS. 1-5 illustrate block diagrams associated with the disclosed concepts. Various methods may be employed to operate these disclosed circuits. Two such methods are discussed in regards to FIGS. 6 and 7.

Figure 6:
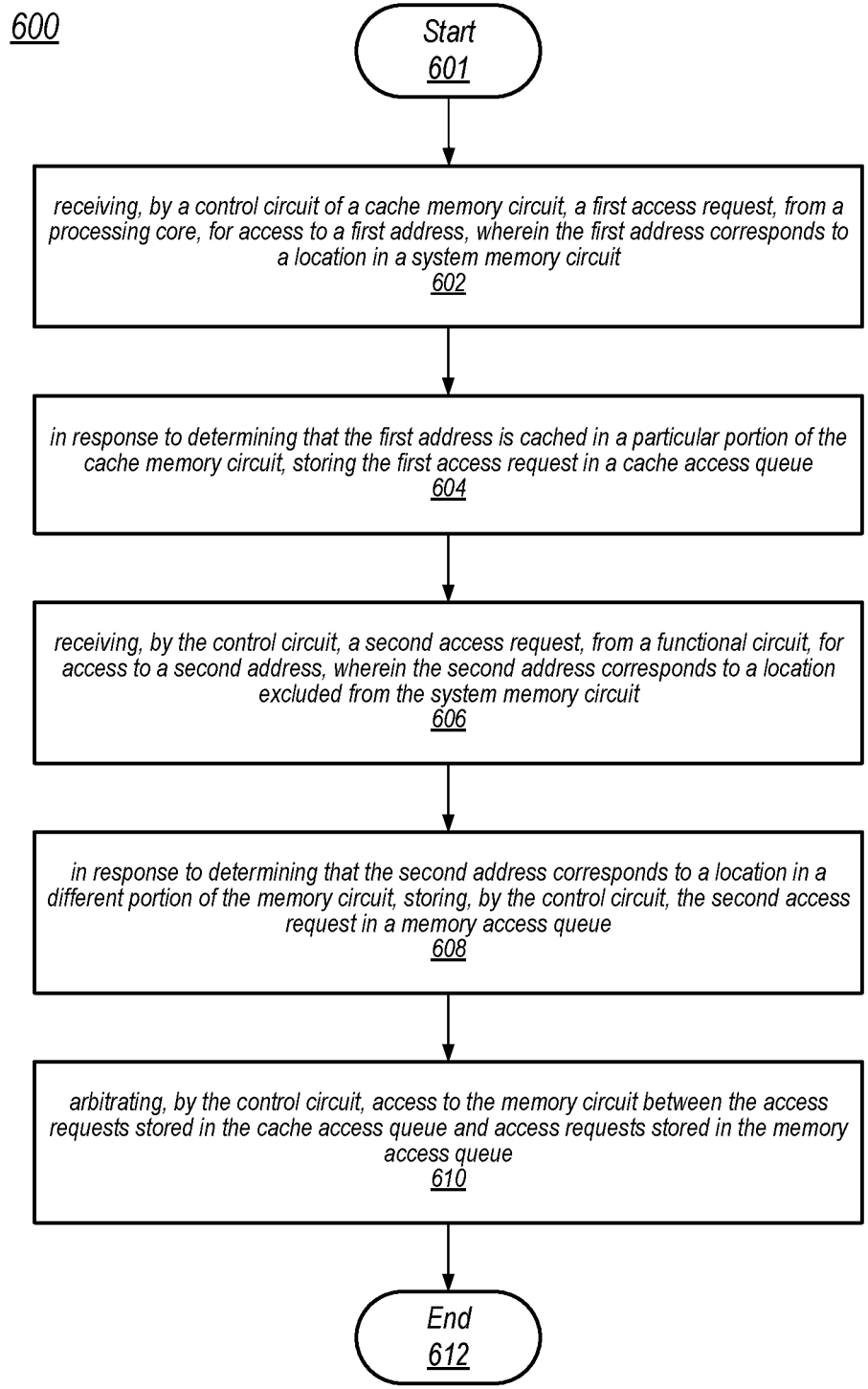
FIG. 6 illustrates a flow diagram of an embodiment of a method for operating a memory circuit.

Proceeding now to FIG. 6, a flow diagram illustrating an embodiment of a method for operating a memory circuit is shown. Method 600 may be applied to any of the previously disclosed circuits, such as processing circuit 100 in FIG. 1. Referring collectively to FIG. 1 and the flow diagram in FIG. 6, method 600 begins in block 601.

A control circuit of a cache memory circuit receives a first access request, from a processing core, for access to a first address, wherein the first address corresponds to a location in a system memory circuit (block 602). As illustrated, processing circuit 100 is included in a larger system, such as computing system 500 in FIG. 5. Processing core 101 sends first access request 141 to control circuit 110. Data corresponding to the first address may be cached in a particular portion of cache memory circuit 105. This particular portion may correspond to a cache portion of cache memory circuit 105, for example regions 120a and 120b. The data cached in the cache portion of cache memory circuit 105 corresponds to data stored in a location elsewhere in computing system 500, such as system memory circuit 570. The first access request maybe a read or write request to the first address.

In response to determining that the first address is cached in the particular portion of the cache memory circuit, the control circuit stores the first access request in a cache access queue (block 604). Control circuit 110, as shown, uses the first address to generate a cache tag and compares the generated cache tag to existing cache tags corresponding to data that has been cached in the cache portion of cache memory circuit 105. In response to determining that the generated tag matches an existing tag, e.g., a cache hit occurs, control circuit 110 stores first access request 141 in cache access queue 112.

The control circuit receives a second access request, from a functional circuit, for access to a second address, wherein the second address corresponds to a location excluded from the system memory circuit (block 606). Functional circuit 130 sends, via communication bus 135, second access request 145 to control circuit 110. The second address corresponds to a memory-mapped portion of cache memory circuit 105 that is excluded from locations in system memory circuit 570. The location addressed by the second address in the memory-mapped portion, therefore, may be an end-point destination for the data stored at the second address. Similar to first access request 141, second access request 145 may be a read or write request.

In response to a determination that the second address corresponds to a location in a different portion of the memory circuit, storing, by the control circuit, the second access request in a memory access queue (block 608). Control circuit 110, as illustrated, determines that the second address corresponds the memory-mapped portion of cache memory circuit 105. In some embodiments, communication bus 135 may include an indication within second access request 145 that the second address corresponds to a location within the memory-mapped portion of cache memory circuit 105. In other embodiments, control circuit 110 may use the second address to generate a cache tag and compares the generated cache tag to existing cache tags corresponding to data lines in the memory-mapped portion of cache memory circuit 105. In response to determining that the second address corresponds to a location in the memory-mapped portion of cache memory circuit 105, control circuit 110 stores second access request 145 in memory access queue 116.

The control circuit arbitrates access to the memory circuit between the access requests stored in the cache access queue and access requests stored in the memory access queue (block 610). Control circuit 110 may select an access request from either cache access queue 112 or from memory access queue 116. Control circuit 110 then proceeds to fulfill the selected address request using cache memory circuit 105. In some embodiments, control circuit 110 may prioritize requests in memory access queue 116 over requests in cache access queue 112. Memory requests may have a higher priority since cache memory circuit 105 is an end-point for memory requests and data associated with the memory requests may not, therefore, be stored in another location. Control circuit 110 may utilize arbitration circuit 117 for selecting a request from either cache access queue 112 or from memory access queue 116. Any suitable criteria may be used for the selection, including types memory operations being requested, which processing circuit generated each request, pre-assigned priorities assigned to received requests, and the like. The method ends in block 612.

It is noted that method 600 is one example related to operation of a memory circuit. Although operations are shown as occurring in sequence, operations such as block 602 and block 606 may occur in a different order, including in parallel. The operations of method 600 may repeat while cache memory circuit 105 is active.

Figure 7:
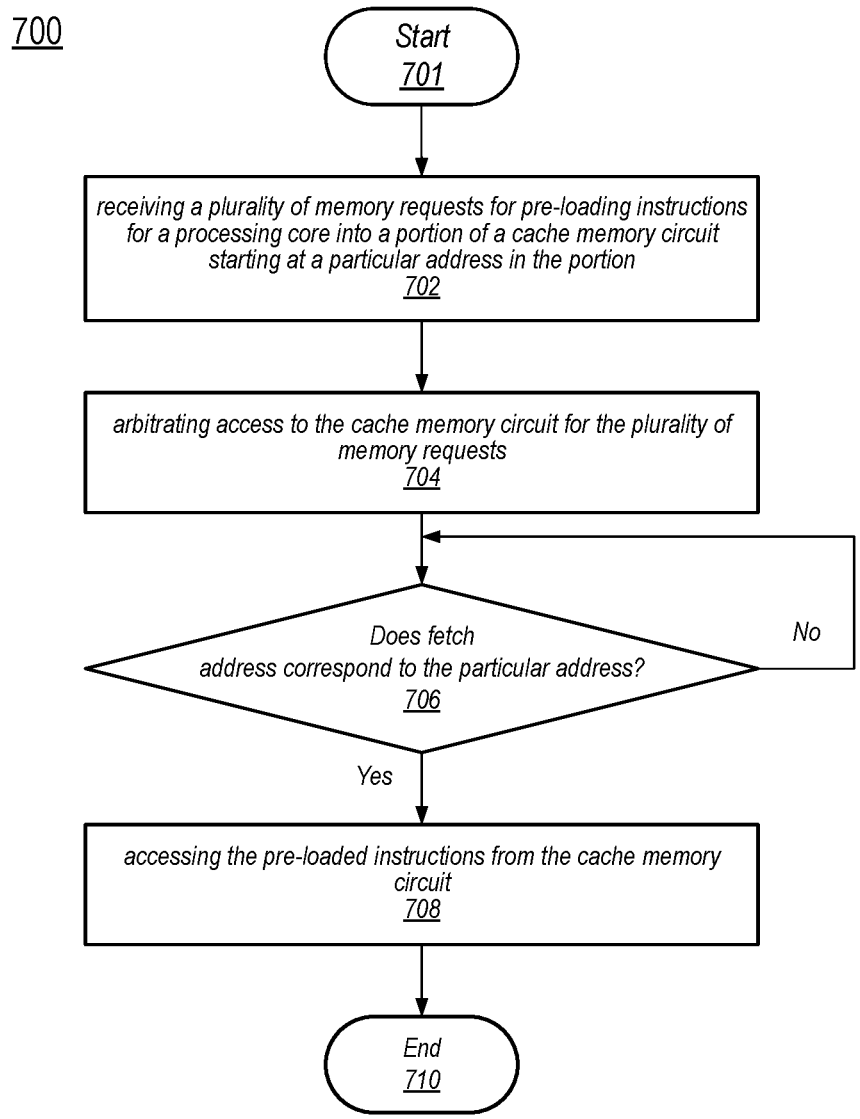
FIG. 7 shows a flow diagram of another embodiment of a method for operating a memory circuit.

Turning now to FIG. 7, a flow diagram illustrating an embodiment of a method for operating a control circuit for a memory circuit is illustrated. Method 700, similar to method 600 above, may be applied to any disclosed memory circuit, such as cache memory circuits 105 and 405 described in regards to FIGS. 1-5. The operations disclosed by method 700 may be performed, in some embodiments, in combination with method 600. Referring collectively to FIG. 5, and the flow diagram of FIG. 7, the method begins in block 701.

A control circuit receives a plurality of memory requests for preloading instructions for a processing core into a portion of a cache memory circuit, starting at a particular address in the portion (block 702). Control circuit 110b, for example, receives a plurality of memory request from processing core 101a, via communication bus 135. The memory requests include instructions and other information that may be utilized by processing core 101b. For example, the preload instructions may correspond to an interrupt service routine for an interrupt signal that is processed by processing core 101b. Processing core 101a stores the preload instructions into memory portion 522b using system addresses that correspond to locations in memory portion 522b.

The control circuit arbitrates access to the cache memory circuit for the plurality of memory requests (block 704). While receiving the memory requests from processing core 101a, control circuit 110b may also receive cache requests from processing core 101b, such as cache request 545, for accessing cached data in cache portion 520b. Control circuit 110b includes an arbitration circuit (e.g., arbitration circuit 117 in FIG. 1) that is utilized to select between queued cache requests for accessing cache portion 520b and queued memory requests for accessing memory portion 522b. The arbitration circuit may use any suitable criteria, as described above, for selecting a particular request to fulfill. Control circuit 110b, at a particular point in time, completes the memory requests associated with the preload instructions.

Further operations of the method may depend on receiving a fetch address that corresponds to the particular address (block 706). As illustrated, processing core 101b includes circuits for fetching instructions to be executed. If the particular address that corresponds to the location in memory portion 522b is included in an instruction fetch operation, then the method may proceed to block 708 to access the preloaded instructions. Otherwise, the method may remain in block 706.

If the preloaded instructions correspond to an interrupt service routine, then processing core 101b may be coupled to one or more interrupt signals that can be asserted based on an occurrence of particular event. Interrupt sources may include signals from various functional circuits included in computing system 500. For example, interrupt sources may include timer and counter circuits reaching particular threshold values, audio or graphics processors completing a task, power management circuits detecting power usage crossing a particular threshold, and the like. For the current example, network processor 560 may assert a networking interrupt in response to completing a reception of a data packet. If the networking interrupt is not asserted, then the method remains in block 706. Otherwise, if the networking interrupt is asserted, then the method moves to block 708 to process an associated interrupt service routine.

A processing core accesses the preloaded instructions from the cache memory circuit (block 708). In response to detecting an instruction fetch to the particular address, processing core 101b issues, for example, cache request 549 for the preloaded instruction stored at the particular address. In some embodiments, cache request 549 may include a request for multiple instructions and/or additional information associated with the preloaded instructions. Control circuit 110b receives cache request 549, determines the particular address corresponds to a location in memory portion 522b, and retrieves one or more of the preloaded instructions. Once the information included in the requested preloaded instructions has been sent to processing core 101b, the method ends in block 710.

Returning to the interrupt service routine example, in response to an assertion of the networking interrupt, processing core 101b pauses execution of a current software process and retrieves an address corresponding to an initial address for a networking interrupt service routine. This address, as illustrated, corresponds to the particular address, which, in turn, corresponds to a start of the interrupt service routine stored by processing core 101a in block 702. In some embodiments, the requests from processing core 101b for the networking interrupt service routine may be treated by control circuit 110b as cache requests, in which case control circuit 110b uses cache tags associated with the corresponding locations in memory portion 522b to retrieve the information included in the interrupt service routine and then sends this information to processing core 101b. In other embodiments, the requests may be processed as memory requests for a direct address associated with the locations in memory portion 522b. Once the information included in the networking interrupt service routine has been sent to processing core 101b, the method ends in block 710.

It is noted that method 700 is one example concerning use of a memory circuit to store and then retrieve, preloaded instructions. Although operations are shown as occurring in sequence, operations such as block 702 and block 704 may occur repeatedly and in a different order, including in parallel. The operations of method 700 may be repeated to store additional preloaded instructions in memory portion 522b.

Figure 8:
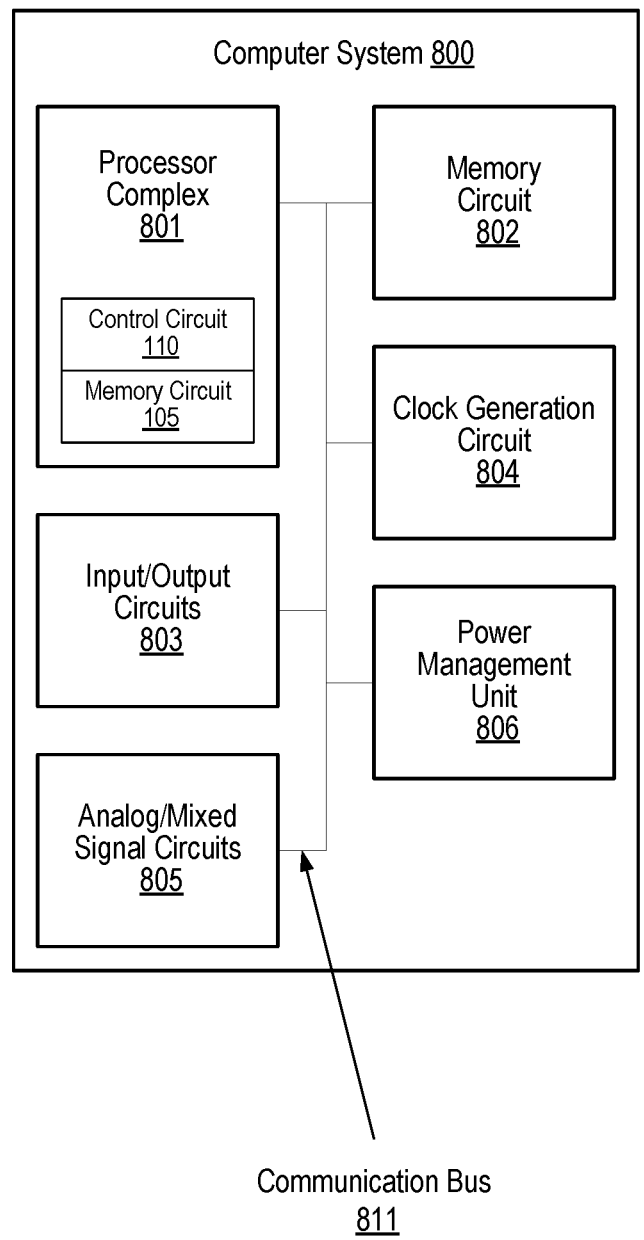
FIG. 8 depicts a block diagram of an embodiment of a computer system.

Processing circuits and memory circuits, such as those described above, may be used in a variety of computer systems, such as a desktop computer, laptop computer, smartphone, tablet, wearable device, and the like. In some embodiments, the circuits described above may be implemented on a system-on-chip (SoC) or other type of integrated circuit (IC). A block diagram illustrating an embodiment of computer system 800 that includes the disclosed circuits is illustrated in FIG. 8. In some embodiments, computer system 800 may provide an example of an IC that includes processing circuit 100 and/or computing system 500 in FIGS. 1 and 5, respectively. As shown, computer system 800 includes processor complex 801, memory circuit 802, input/output circuits 803, clock generation circuit 804, analog/mixed-signal circuits 805, and power management unit 806. These functional circuits are coupled to each other by communication bus 811. In some embodiments, communication bus 811 may correspond to communication bus 135.

In some embodiments, processor complex 801 may include processing circuit 100. Processor complex 801, in various embodiments, may be representative of a general-purpose processor that performs computational operations. For example, processor complex 801 may be a central processing unit (CPU) such as a microprocessor, a microcontroller, an application-specific integrated circuit (ASIC), or a field-programmable gate array (FPGA). In some embodiments, processor complex 801 may correspond to a special purpose processing core, such as a graphics processor, audio processor, or neural processor, while in other embodiments, processor complex 801 may correspond to a general-purpose processor configured and/or programmed to perform one such function. Processor complex 801, in some embodiments, may include a plurality of general and/or special purpose processor cores as well as supporting circuits for managing, e.g., power signals, clock signals, and memory requests. In addition, processor complex 801 may include one or more levels of cache memory to fulfill memory requests issued by included processor cores. In some embodiments, processor complex 801 may include the previously disclosed cache memory circuit 105 and control circuit 110.

Memory circuit 802, in the illustrated embodiment, includes one or more memory circuits for storing instructions and data to be utilized within computer system 800 by processor complex 801. In various embodiments, memory circuit 802 may include any suitable type of memory such as a dynamic random-access memory (DRAM), a static random-access memory (SRAM), a read-only memory (ROM), electrically erasable programmable read-only memory (EEPROM), or a non-volatile memory, for example. It is noted that in the embodiment of computer system 800, a single memory circuit is depicted. In other embodiments, any suitable number of memory circuits may be employed.

Input/output circuits 803 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 803 may be configured to implement a version of Universal Serial Bus (USB) protocol or IEEE 1394 (Firewire®) protocol.

Input/output circuits 803 may also be configured to coordinate data transfer between computer system 800 and one or more devices (e.g., other computing systems or integrated circuits) coupled to computer system 800 via a network. In one embodiment, input/output circuits 803 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 803 may be configured to implement multiple discrete network interface ports.

Clock generation circuit 804 may be configured to enable, configure and manage outputs of one or more clock sources. In various embodiments, the clock sources may be located in analog/mixed-signal circuits 805, within clock generation circuit 804, in other blocks with computer system 800, or come from a source external to computer system 800, coupled through one or more I/O pins. In some embodiments, clock generation circuit 804 may be capable of enabling and disabling (e.g., gating) a selected clock source before it is distributed throughout computer system 800. Clock generation circuit 804 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 805 may include a variety of circuits including, for example, a crystal oscillator, PLL or FLL, and a digital-to-analog converter (DAC) (all not shown) configured to generated signals used by computer system 800. In some embodiments, analog/mixed-signal circuits 805 may also include radio frequency (RF) circuits that may be configured for operation with cellular telephone networks. Analog/mixed-signal circuits 805 may include one or more circuits capable of generating a reference voltage at a particular voltage level, such as a voltage regulator or band-gap voltage reference.

Power management unit 806 may be configured to generate a regulated voltage level on a power supply signal for processor complex 801, input/output circuits 803, memory circuit 802, and other circuits in computer system 800. In various embodiments, power management unit 806 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 806 may include various circuits for managing distribution of one or more power signals to the various circuits in computer system 800, including maintaining and adjusting voltage levels of these power signals. Power management unit 806 may include circuits for monitoring power usage by computer system 800, including determining or estimating power usage by particular circuits.

It is noted that the embodiment illustrated in FIG. 8 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 9:
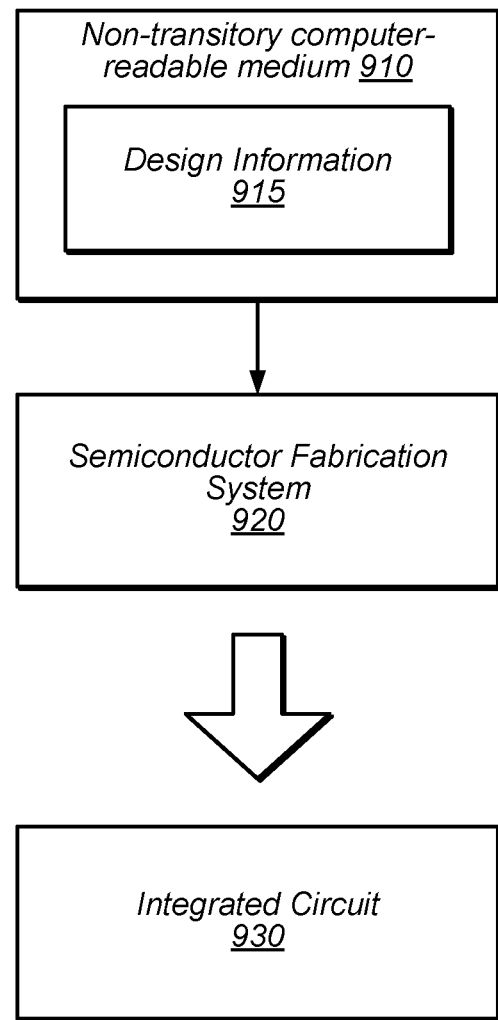
FIG. 9 illustrates a block diagram depicting an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, an IC that includes computer system 800 of FIG. 8. In the illustrated embodiment, semiconductor fabrication system 920 is configured to process the design information 915 stored on non-transitory computer-readable storage medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a cache memory circuit configured to store a plurality of cache lines in different ones of a plurality of regions; and
   a control circuit configured to:
      receive a first access request and a second access request to access the cache memory circuit;
      in response to a determination that the first access request is from a processor core coupled to the control circuit, and that the first access request includes a first address associated with a particular cache line in a particular region of the plurality of regions, store the first access request in a cache access queue;
      in response to a determination that the second access request is received via a communication bus from a functional circuit, and that the second access request includes a second address that is included in a range of a memory address space mapped to a subset of the plurality of regions, store the second access request in a memory access queue, wherein the subset of the plurality of regions excludes the particular region; and
      arbitrate access to the cache memory circuit between the first access request and the second access request.

2. The apparatus of claim 1, wherein the control circuit is further configured to, in response to an indication to map the subset of the plurality of regions to the range of memory address space, generate respective tags for memory locations in the subset of the plurality of regions.

3. The apparatus of claim 2, wherein the control circuit is further configured to:
   receive a third access request to access the cache memory circuit;
   in response to a determination that the third access request is from the processor core, and that the third access request is a read request that includes the second address:
      compare the second address with respective tags associated with the particular region and the subset of the plurality of regions to generate comparison results; and
      retrieve the particular data stored in the subset of the plurality of regions using the comparison results.

4. The apparatus of claim 1, wherein the control circuit is further configured to, in response to a determination that the first access request is a read access request, retrieve previously stored data from the particular region of the plurality of regions using results of a comparison of tag information associated with the previously stored data and the first address.

5. The apparatus of claim 1, wherein address values included in a remaining portion of the memory address space are mapped to respective ones of a plurality of locations in system memory, wherein the remaining portion of the memory address space excludes the range.

6. The apparatus of claim 1, wherein the control circuit includes a register circuit configured to store data indicative of a starting address of the subset of the plurality of regions of the cache memory circuit that is mapped to the range of the memory address space.

7. The apparatus of claim 6, wherein the control circuit is further configured to select the starting address based on address boundaries between cache ways.

8. A method, comprising:
 receiving, by a control circuit of a cache memory circuit, a first access request, from a processing core, for access to a first address, wherein the first address corresponds to a location in a system memory circuit;
 in response to determining that the first address is cached in a particular portion of the cache memory circuit, storing the first access request in a cache access queue;
 receiving, by the control circuit, a second access request, from a functional circuit, for access to a second address, wherein the second address corresponds to a location excluded from the system memory circuit;
 in response to determining that the second address corresponds to a location in a different portion of the cache memory circuit, storing, by the control circuit, the second access request in a memory access queue; and
 arbitrating, by the control circuit, access to the cache memory circuit between access requests stored in the cache access queue and access requests stored in the memory access queue.

9. The method of claim 8, further comprising using, by the control circuit, the particular portion of the cache memory circuit as a cache memory for the processing core.

10. The method of claim 9, further comprising using, by the control circuit, the different portion of the cache memory circuit as memory-mapped random-access memory locations that are an addition to the system memory circuit.

11. The method of claim 8, wherein the second access request is a write request to store data at the second address; and
 further comprising receiving, from the processing core, a third access request to read the data stored at the second address.

12. The method of claim 8, further comprising receiving, by the control circuit from the functional circuit, a plurality of access requests for preloading instructions in the different portion of the cache memory circuit, starting at a particular address in the different portion.

13. The method of claim 12, further comprising, in response to receiving a fetch address corresponding to the particular address, accessing and executing, by the processing core, the preloaded instructions from the different portion of the cache memory circuit.

14. The method of claim 8, further comprising, in response to a determination that fulfilling the first access request results in a change to a value stored at the first address, issuing, by the control circuit, a write-back memory request to the system memory circuit.

15. An apparatus, comprising:
 a cache interface circuit configured to:
  receive, from a processing core, a plurality of cache requests for a particular portion of a cache memory circuit; and
  store the plurality of cache requests in a cache access queue;
 a memory interface circuit configured to:
  receive, from a functional circuit via a communication bus, a plurality of memory requests for a different portion of the cache memory circuit; and
  store the plurality of memory requests in a memory access queue; and
 an arbitration circuit configured to arbitrate access to the cache memory circuit between a particular one of the plurality of cache requests and a particular one of the plurality of memory requests.

16. The apparatus of claim 15, wherein to arbitrate access to the cache memory circuit, the arbitration circuit is further configured to prioritize requests in the memory access queue over requests in the cache access queue.

17. The apparatus of claim 15, wherein to arbitrate access to the cache memory circuit, the arbitration circuit is further configured to pause a serial cache request to allow a memory request to complete.

18. The apparatus of claim 15, wherein, in response to a determination that the cache access queue is full, the cache interface circuit is further configured to send a new cache request to a retry queue.

19. The apparatus of claim 15, wherein the cache interface circuit is further configured to receive, from the processing core, at least one cache request for the different portion of the cache memory circuit.

20. The apparatus of claim 15, wherein the plurality of cache requests each include a respective address corresponding to respective locations in a system memory circuit that is different from the cache memory circuit; and
 wherein the plurality of memory requests each include a respective address corresponding to a respective location in the different portion of the cache memory circuit.

* * * * *